Oct. 20, 1936.   A. R. THOMPSON   2,058,045
FRUIT PITTER
Filed Oct. 17, 1931   3 Sheets-Sheet 3

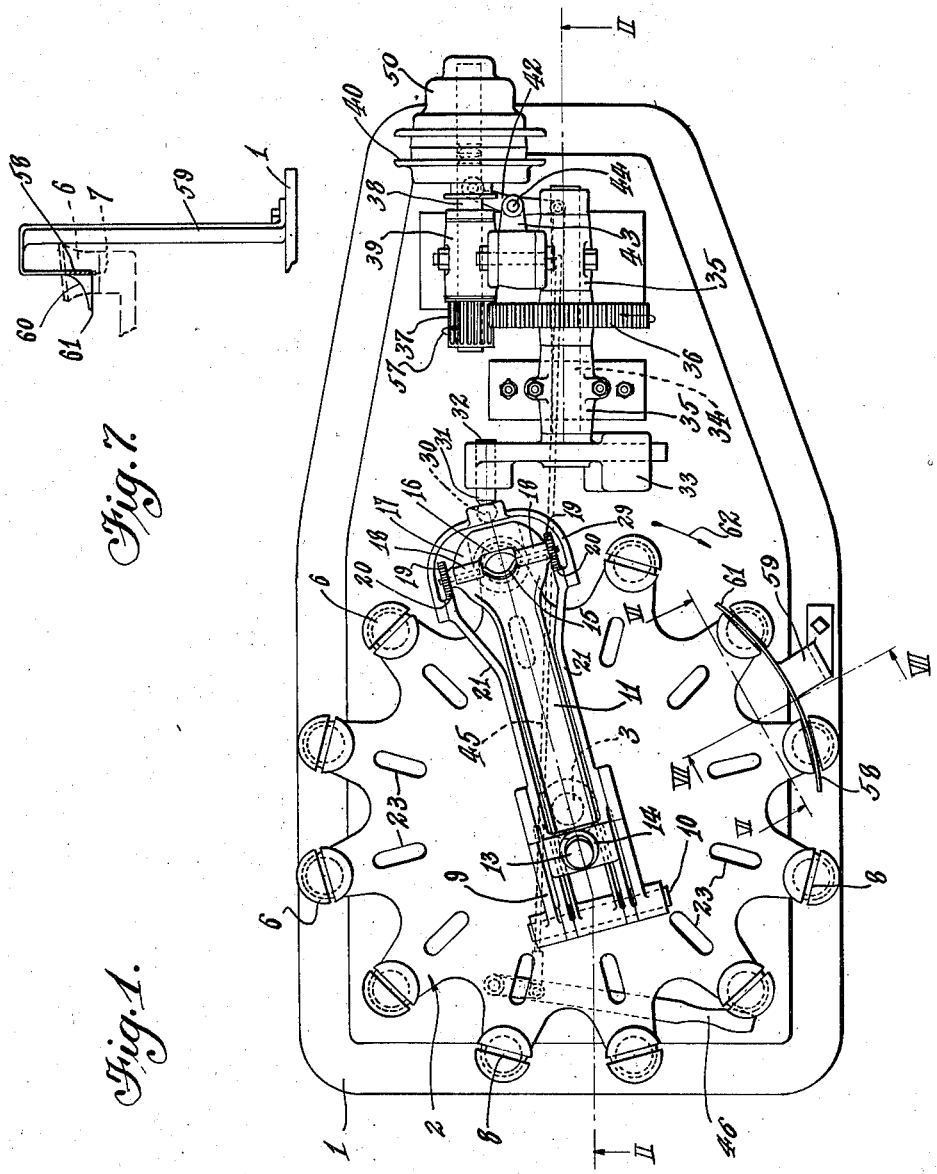

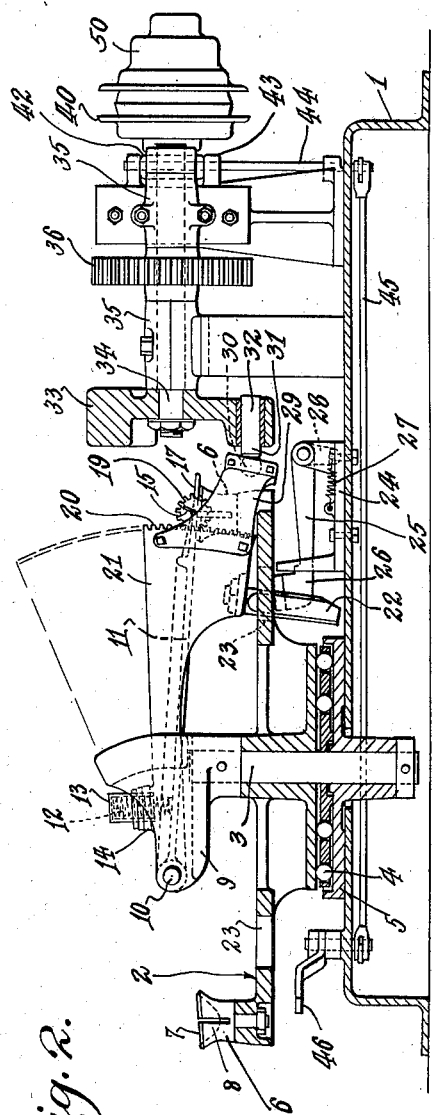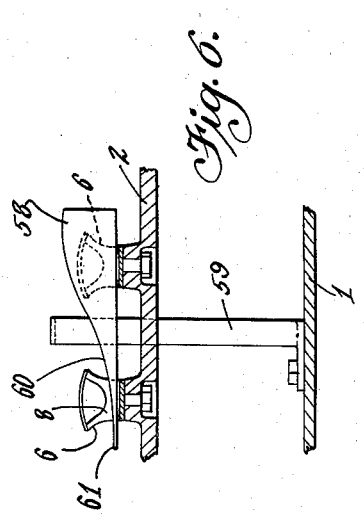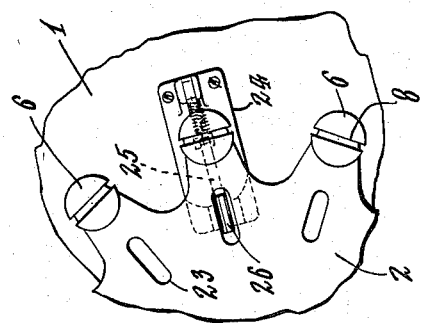

Inventor
Albert R. Thompson
By Lyon & Lyon
Attorneys

Patented Oct. 20, 1936

2,058,045

UNITED STATES PATENT OFFICE 2,058,045

FRUIT PITTER

Albert R. Thompson, San Jose, Calif., assignor to Pacific Machinery Company, San Francisco, Calif., a corporation of California Application October 17, 1931, Serial No. 569,359

7 Claims. (Cl. 146—28)

This invention relates to fruit pitters, and more particularly to a machine for the pitting of half sections of clingstone peaches. This invention is addressed to an improvement over that disclosed in my copending application, Serial No. 103,760, for Machine for pitting split fruit, filed April 22, 1926, and allowed August 31, 1931.

It is an object of this invention to provide a peach pitter for removing the pits from peaches or other fruit, which fruit has been previously halved by cutting through the flesh of the fruit and severing the pit of the fruit, or for the removing of pits from fruit which has split pits.

It is another object of this invention to provide a power driven apparatus for the removing of pits from halves of fruit, and which includes means for receiving the halves of the fruit and holding the halves in stationary upright position with their cut surface uppermost, means for intermittently feeding the fruit so held to a pitting means which contacts the fruit at the cut surface and includes a pit removing means which is driven during the interval of contact of the pitting means with the cut surface of the fruit.

Other objects and advantages of this invention it is believed will be apparent from the following detailed description of a preferred embodiment thereof as illustrated in the accompanying drawings.

In the drawings:

Figure 1 is a top plan view of the pitting machine embodying my invention.

Figure 2 is a side elevation partly in vertical midsection substantially on the line 2—2 of Figure 1.

Figure 5 is a fragmental plan view of a fruit pitting machine embodied in my invention illustrating a holding means as moved into position to begin the pitting operation.

Figure 6 is a fragmental plan view taken substantially on the line 6—6 of Figure 1.

Figure 7 is a fragmental plan view taken substantially on the line 7—7 of Figure 1.

Figure 3:
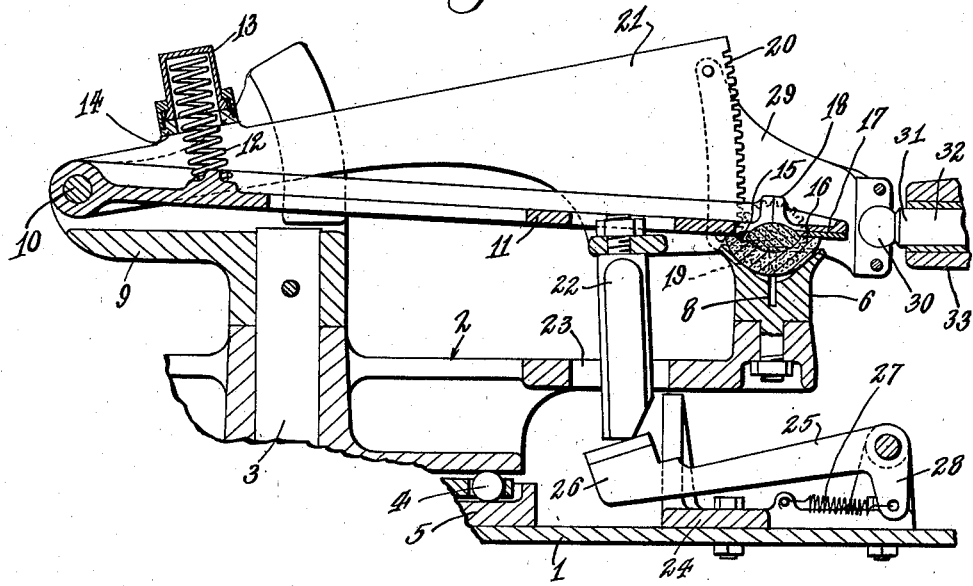
Figure 3 is an enlarged fragmental sectional view illustrating the fruit pitting means as contacting the fruit as held in the supporting means preparatory to the removal of the pit from the half of the fruit.
Figure 4:
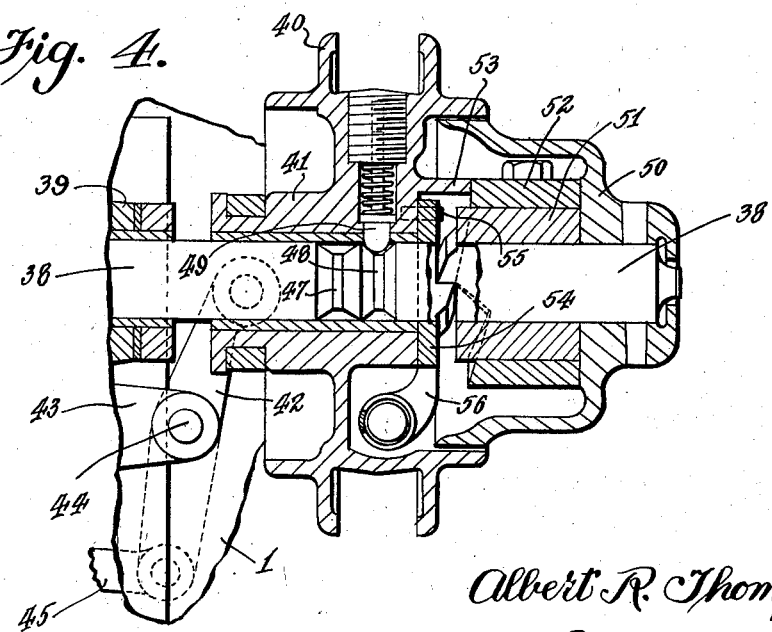
Figure 4 is a fragmental sectional view of the clutch mechanism embodied in my invention.

In the preferred embodiment of my invention illustrated in the accompanying drawings, I indicates a frame. Supported on the frame I is a turret 2 which is journaled on a vertically disposed shaft 3. The turret 2 is supported on bearings 4 carried on bearing plate 5 mounted upon the shaft 3.

The turret 2 carries at intervals around its periphery fruit holding cups 6 which are adapted to receive halves of fruit, the pits of which are split, or have been cut. The upper periphery of the cups are slightly inclined downwardly toward the outer periphery of the turret 2 as indicated at 7. The cups 6 are slit or slotted as indicated at 8 to receive a fruit ejector, as will hereinafter be set forth.

Secured to the shaft 3 is a bracket 9, to which is pivotally secured, as indicated at 10, a pitting arm 11. The bracket 9 is bifurcated, and the pitting arm 11 is mounted between the bifurcations of the bracket 9. The arm 11 is normally urged downwardly by means of a spring 12 which engages the upper surface of the pitting arm 11, and is adjustably secured within a sleeve 13 adjustably secured to a boss 14 formed integral with the bracket 9.

The pitting arm 11 carries at its forward end a pitting knife 15 which is curved to approximate the contour of the pit of the fruit in the plane of its greatest diameter. The pitting knife 15 is supported adjacent an aperture 16 formed through the plate end 17 of the arm 11.

When the pitting knife 15 is rotated, it rotates through the aperture 16 to cut the pit or half pit of the fruit from the half of the fruit supported in the fruit supporting cups 6. The pitting knife 15 has two oppositely extending shanks which fit within bearing bosses 18 carried on the upper periphery of the plate 17 so that the pitting knife is supported at each end. Secured to the ends of the shanks of the pitting knife 15 are pinions 19 which are adapted to mesh with racks 20 formed at the ends of rack arms 21 which are pivotally mounted on the pivot pin supporting the pitting arm 11.

In order to hold the pitting arm 11 in position with relation to the cups 6 of the turret 2, and in order to rotate the the turret 2, I prefer to employ the following means:

Secured to the lower end of the rack arms 21 is a centering and rotating lever 22 which is adapted to be projected through rotation slots 23 formed in the turret 2. Secured to the frame I is a bracket 24 which pivotally supports a stop lever 25, the upper end of which is provided with a stop arm 26 which is adapted to be projected into the rotation slots 23 of the turret 2 when the center of the rotating lever 22 is withdrawn therefrom.

A spring 27 which is connected at one end to bracket 24 and at its opposite end with the crank arm 28 of the lever 25 which acts to yieldably urge the stop arm 26 into position within the slots 23.

In order to actuate pitting arm 11 to raise and lower the same from the pitting cup 6, hence to operate the pitting knife 15 and to rotate the turret 2, the following means are preferably provided:

Secured to the ends of the arms 21 is a socket member 29 which provides a ball socket 30 into which the ball end 31 of a driving pin 32 is positioned. The driving pin 32 is secured to a driving disc 33. The driving disc 33 is in turn secured to a countershaft 34. The countershaft 34 is supported in bearings 35 upon the frame 1. Secured to the countershaft 34 is a driven pinion 36 which meshes with a drive pinion 37 secured to a clutch shaft 38. The clutch shaft 38 is supported in a bearing 39 mounted upon a bearing standard secured to the frame 1.

The clutch shaft 38 is driven from a clutch pulley 40 which is journaled on, and releasably secured to, the clutch shaft 38. The pulley 40 is driven from any suitable or desirable source of power.

The clutch for releasably clutching clutch pulley 40 to the clutch shaft 38 is of the make-and-break yieldable type and is similar to that disclosed in my copending application, Serial No. 546,958, filed June 26, 1931.

The hub 41 of the pulley 40 is mounted on the shaft 38 so as to move longitudinally of the shaft 38 into and out of position to engage and drive the shaft 38.

In order to shift the pulley 40 to and from engaging position, a shifting fork 42 is provided which is pivotally secured intermediate its ends to a bracket 43. Secured to the end of the shifter fork 42 is a clutch rod 44 which extends downwardly and is secured to a clutch rod 45 which extends longitudinally of the frame 1 and is secured at the forward end of the frame 1 to a clutch operating handle 46.

The shaft 38 is provided with a pair of grooves 47 and 48 into either of which a spring pressed dog 49 carried by the pulley 40 is adapted to be positioned. The spring pressed dog 49 acts to yieldably hold the pulley 40 in or out of driving position.

Secured to the end of the shaft 38 is a clutch collar 50 which is pinned to the shaft 38. Mounted on the shaft 38, within the clutch collar 50, is a clutch ring 51 which is keyed to the shaft 38. Mounted on the clutch ring 51 is a cam ring 52. The cam ring 52 is secured to the clutch ring by means of cap bolts. A cam flange 53 is formed integral with the pulley 40 and complementary cam faces are formed on the cam ring 52 and cam flange 53 respectively.

Journaled on the shaft 38 is a yieldable drive clutch ring 54 which is secured to the hub 41 of the drive pulley 40 by means of pins 55. The pins 55 are positioned within arcuate slots formed in the yieldable drive ring 54. The drive ring 54 is formed with an integral arm 56 which carries a spring lug at its outer end. A spring stop is formed integral with the casting forming the pulley 40 and a spring is interposed between the spring lug and spring stop and acts to yieldably urge the arm 56 away from the spring stop. This construction is not herein specifically disclosed, but is shown in detail in my copending application above referred to.

Formed between the yieldable clutch drive ring 54 and the clutch ring 51 are complementary clutching faces. The shaft 38 is rotated in the direction of the arrow 57. The yieldable clutch drive thus provided forms a yieldable drive so that when more than a predetermined resistance to the driving of the shaft 38 is set up in the fruit pitter such, for example, as by the pitting knives 15 hanging up on the pit, the clutch is thrown out to stop further driving of the shaft 38 and hence the curved pitting knife 15.

Means are provided for removing the halves of the peach from the cup 6 after the pits have been removed, which means preferably includes a fruit removing bar 58 which is secured to a bracket 59 mounted on the frame 1. The fruit removing bar 58 is tapered as indicated at 60 and is curved in form to ride in the slots 8 formed in the fruit cups 6. The forward end 61 of the bar 58 passing under the fruit as the fruit moves forwardly along the bar 58 results upon further movement of the turret 2 in the throwing of the halves of the fruit out of the cups 6.

The operation of the fruit pitter embodying my invention is:

The operator standing in the position adjacent the clutch handle 46 places the halves of the peaches in the cup 6 with their cut surfaces uppermost and with the pits of the fruit turned in a line with the slots 8. The slots 8 thus perform the additional function of providing a guide for the placing of the halves of fruit. The turret 2 rotates intermittently when the operator engages the clutch by actuation of the clutch lever 46 so that the countershaft 34 is driven. The driving disc 33 rotates the driving pin 32 so that the rack arms 21 and the pitting arms 11 are raised upwardly to the dotted line position shown in Figure 1 and are moved forwardly in the direction of the arrow 62, moving the pitting arm forwardly in the direction of the arrow 62. During the raising of the pitting arms, the driving arms 22 are raised out of the slots 23 and are moved forwardly to a position where they pass into a second slot 23 which is, during this interval of time, occupying the stop arm 26, forcing the stop arm 26 downwardly against the pressure of the spring 27.

On continued movement of the disc 33, the turret 2 is rotated until the stop arm 26 again falls into one of the slots 23. At this period of time the arms 11 move their maximum in the lateral direction and further movement of the disc 33 results in the depressing of the rack arms 21 relative to the pitting arms 11 so that the racks 20 are driven by the pinions 18 to rotate the pitting knife 15 through the aperture of the plate which is at this moment in contact with the cut surface of the fruit with the aperture of this plate in register with the pit of the fruit.

After the fruit is pitted, further rotation of the disc 33 results in the raising of the arms 21 and 11 and a repetition of the cycle just described. The fruit cups, on passing the ejecting arms 58 cause the halves of the fruit to be ejected from the cup 6.

Having fully described my invention, it is to be understood that I do not wish to be limited to the details herein set forth, but my invention is of the full scope of the appended claims.

I claim:

1. In a fruit pitter, the combination of a horizontally rotating turret, fruit cups supported by said turret to receive halves of fruit with their halved surfaces uppermost, a pitting mechanism supported over said turret, means for actuating said pitting mechanism to operatively engage said turret to rotate the turret and to position said pitting mechanism successively with relation to said cups, a pitting knife carried by the pitting mechanism, and means carried by the pitting mechanism to actuate said pitting knife in timed relation with the actuation of the pitting mechanism.

2. In a peach pitting mechanism, the combination of a turret, a plurality of equally spaced holding members supported by the turret to receive halves of peaches, a pitting arm, pitting means supported by the pitting arm, means for reciprocating said pitting arm to intermittently engage and rotate the turret and to position said pitting means with relation to the half peaches during the advance of the turret, and means for actuating the pitting knife to remove the pit from the half peach as the pitting arm is moved to advance the turret.

3. In a peach pitting mechanism, a plurality of equally spaced holding members supported by the turret to receive half peaches, a pitting arm pivotally mounted on an axis common with the axis of the turret, pitting means supported by the pitting arm, means for reciprocating said pitting arm to intermittently rotate the turret and to position said pitting means with relation to the half peaches during the advance of the turret, and means for actuating the pitting means as the pitting arm has been moved to advance the turret.

4. In a peach pitting mechanism, the combination of a turret, a plurality of equally spaced holding members supported by the turret to receive half peaches, a pitting arm, pitting means supported by the pitting arm, means for reciprocating said pitting arm to operatively engage and to intermittently rotate the turret, stop means for holding the turret from rotation during the return of the pitting arm, and means for actuating the pitting means as the pitting arm is moved to advance the turret.

5. In a peach pitting mechanism, the combination of a turret, a plurality of equally spaced holding members supported by the turret to receive half peaches, a pitting arm, pitting means supported by the pitting arm, means for reciprocating said pitting arm to operatively engage the turret and to intermittently rotate the turret to advance the holding members in position with relation to the pitting means, means for holding the turret from rotation as the pitting arm returns from its advance position, means carried by the pitting arm for releasing the latter said holding means to permit the pitting arm to rotate the turret, and means for actuating the pitting means during the advancing of the turret to remove the pit from the half fruit.

6. In a fruit pitting machine, the combination of a turret mounted to rotate in a substantially horizontal plane provided with a plurality of equally spaced fruit holding cups located on the upper surface thereof into which halves of fruit are adapted to be positioned with their cut surfaces uppermost, a fruit pitting arm mounted to operate above the turret, a fruit pitting knife carried by the pitting arm, and intermittently operable means for intermittently rotating the turret and the fruit holding cups, said last named means including means for positively forcing the pitting arm and knife toward the fruit, and said knife into contact with the cut uppermost surfaces of the fruit, and means to rotate said knife to remove the pits from the fruit.

7. In a fruit pitting machine, the combination of a turret mounted to rotate in a substantially horizontal plane provided with a plurality of equally spaced fruit holding cups located on the upper surface thereof into which halves of fruit are adapted to be positioned with their cut surfaces uppermost, an apertured plate adapted to contact the cut surfaces of the fruit supported within the cups with the aperture thereof over the pit, a fruit pitting arm mounted to operate above the turret, a fruit pitting knife carried by the pitting arm and intermittently operable means for intermittently rotating the turret and the fruit holding cups, said last named means including means for positively forcing the pitting arm and knife toward the fruit and said knife into contact with the cut uppermost surfaces of the fruit, and means to rotate said knife in said aperture to remove the pits from the fruit.

ALBERT R. THOMPSON.